(12) United States Patent
Brun

(10) Patent No.: US 6,395,203 B1
(45) Date of Patent: May 28, 2002

(54) PROCESS FOR PRODUCING LOW IMPURITY LEVEL CERAMIC

(75) Inventor: Milivoj Konstantin Brun, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/385,888

(22) Filed: Aug. 30, 1999

(51) Int. Cl.$^7$ .................. C01B 31/00; B28B 7/04; B29C 59/00
(52) U.S. Cl. ............. 264/29.1; 264/39; 264/129
(58) Field of Search ............... 264/29.1, 39, 240, 264/129, 241

(56) References Cited

U.S. PATENT DOCUMENTS

| | | | |
|---|---|---|---|
| 3,951,587 A | 4/1976 | Alliegro et al. | 432/253 |
| 4,120,731 A | 10/1978 | Hillig et al. | 106/44 |
| 4,141,948 A | 2/1979 | Laskow et al. | 264/101 |
| 4,148,894 A | 4/1979 | Hillig et al. | 428/242 |
| 4,238,433 A | 12/1980 | Hillig et al. | 264/60 |
| 4,240,835 A | 12/1980 | Laskow et al. | 106/44 |
| 4,294,788 A | 10/1981 | Laskow et al. | 264/101 |
| 4,385,020 A | 5/1983 | Morelock | 264/62 |
| 4,737,328 A | 4/1988 | Morelock | 264/62 |
| 4,761,134 A | 8/1988 | Foster | 432/253 |
| 4,836,965 A | 6/1989 | Hayashi et al. | 264/82 |
| 4,889,686 A | 12/1989 | Singh et al. | 419/13 |
| 4,931,311 A | 6/1990 | Singh et al. | 427/56.1 |
| 4,998,879 A | 3/1991 | Foster et al. | 432/253 |
| 5,132,145 A | 7/1992 | Valentian | 427/249 |
| 5,432,253 A * | 7/1995 | Singh | 501/92 |
| 5,800,924 A | 9/1998 | Metter | 428/408 |

FOREIGN PATENT DOCUMENTS

JP 405148025 * 6/1993

* cited by examiner

Primary Examiner—Christopher A. Fiorilla
(74) Attorney, Agent, or Firm—Noreen C. Johnson; Christian G Cabou

(57) ABSTRACT

A porous carbon body is produced from a carbon felt with a low level of metal impurity by forming the body from a carbon felt with a low level of metal impurity, and infiltrating the body with silicon. In another aspect of the invention, an annealing furnace is treated with a halide-containing gas at elevated temperature to scavenge metal impurities. A porous carbon body is then infiltrated with silicon in the annealing furnace.

15 Claims, No Drawings

PROCESS FOR PRODUCING LOW IMPURITY LEVEL CERAMIC

BACKGROUND OF THE INVENTION

The invention relates to furniture such as a fixture or boat used in the manufacture of semiconductor wafers.

Semiconductor wafers are used as diodes, transistors and integrated circuits. The wafer manufacturing process involves a large number of process steps to form a multitude of extremely small and complex electrical circuits on the semiconductor wafer. As technology has progressed, the wafers have been made larger and the feature size of the elements of the circuitry on the wafer's surface have been greatly decreased. As the size of the circuitry has decreased, contamination has become a serious yield problem. Semiconductor standards require extremely low levels of impurities in the semiconductor processing system. Substantially no impurities should be incorporated into the semiconductor material, as even trace amounts can alter electronic semiconductor properties. Even very small sized particle contaminants can cause a short circuit or cause a spacing in the circuitry. A contaminating particle can block processing chemicals from reaching portions of the circuitry. Contaminants can cause incomplete etching in spaces between lines thus leading to an unwanted electrical bridge. Some contaminants can cause electrical failure through induced ionization or by creating trapping centers in gate dielectrics or the like.

Diffusion annealing is one of the critical steps in semiconductor wafer processing. In this step, the wafer surface is covered with a layer of oxide which has been selectively etched in areas where doping is needed. The wafer is then exposed to an atmosphere that transports various dopants onto the wafer surface. It is important that only intended dopants are transported to the wafer, so the cleanliness of the furnace tube and structure supporting the wafer (wafer carrier) is of paramount importance. Additional important properties of the wafer carrier are low thermal mass and resistance to thermal shock, so that the wafer can be heated and cooled rapidly to minimize processing time.

Fused silica, known in the trade as fused quartz is the most commonly used material for handling of semiconductor wafers because it can be produced with relatively low impurity content. However, silica components lose mechanical strength and progressively devitrify with time at the processing temperatures within the annealing furnace. The quartz components distort from the frequent heating and cooling within the furnace and they do not withstand hydrofluoric acid that is commonly used to clean semiconductor processing furniture. Increasingly, silicon carbide-based materials (SiC) are used for construction of the semiconductor-handling furniture. Silicon carbide has technological advantages over quartz. The silicon carbide has better deformation resistance and higher resistance to the acids that are used for furniture cleaning.

Alliegro et al., U.S. Pat. No. 3,951,587 discloses a diffusion furnace having a liner, process tube, paddle or boat that are composed of high purity sintered or recrystallized silicon carbide that has been impregnated with 5 to 30% by weight of high purity silicon metal. The silicon metal renders the components impervious to gases. Alliegro et al. teaches that both the silicon carbide and silicon metal should be as high purity as possible to avoid wafer contamination. The materials should be at least 99% pure and more desirably at least 99.9% pure.

Japanese Patent Publication No. 52-145419 teaches diffusion furnace components of the same general type. The Japanese Patent Publication teaches depositing an impervious high purity coating of silicon carbide onto the surfaces of the components. The coating is vapor deposited applied under vacuum at high temperature to form an impervious coating of silicon carbide.

Foster U.S. Pat. No. 4,761,134 teaches diffusion furnace components such as liners, process tubes, paddles, and boats made up of a pure sintered silicon carbide impregnated with silicon metal. The components are further protected by applying a coating of a high purity refractory material such as silicon carbide, silicon nitride or silicon dioxide. In the Foster patent, the term "high purity" is defined to mean at least 99% pure and preferably at least 99.9% pure.

Foster et al., U.S. Pat. No. 4,998,879 discloses furnace furniture constructed from a matrix of silicon carbide or silicon nitride, with an internal fibrous reinforcement of silicon carbide fabric or carbon or graphite fabric, including carbon/carbon composite converted to SiC. The fabric is of an open structure to allow infiltration and build up of the matrix by chemical vapor infiltration and deposition. The fabric is first formed into a desired final shape by using a temporary binder such as a liquid phenolic heat setting polymer or by use of a thermoplastic softened by a solvent. After shaping and burnout of the binder, the fiber preform is infiltrated and coated in a high temperature reaction chamber. Foster et al. teaches Infiltration and coating by silicon carbide by hydrogen reduction of methyltrichlorosilane and infiltration and coating by silicon nitride by the hydrogen reduction of silicon tetrachloride and ammonia.

These patents stress the need for high purity furniture for an annealing furnace. The patents provide materials that are stated to be at least 99% pure, preferably at least 99.9% pure. Foster et al., U.S. Pat. No. 4,998,879 at column 4, shows materials that include Fe impurities of 22 ppm and 72 ppm. Other impurities are present in amounts on the same scale. Unfortunately, annealing furnace furniture with even these low amounts of impurities substantially contributes to semiconductor impurity. Thus, there is a need to provide a composite with a lower impurity level for use as semiconductor wafer processing furniture.

SUMMARY OF THE INVENTION

The present invention provides a process to produce a low impurity level ceramic composite. The composite produced by the process is characterized by the presence of detrimental elements in concentrations lower than 0.5 ppm. In the process, an annealing furnace is treated with a halide-containing gas at elevated temperature to scavenge metal impurities, and a porous carbon body is infiltrated with silicon within the annealing furnace.

In another aspect, the invention relates to a process wherein a porous carbon body is formed from a carbon felt with a low level of metal impurity and the porous carbon body is infiltrated with silicon.

In still another aspect, the invention relates to semiconductor processing furniture produced by the process. The furniture comprises a high purity silicon melt infiltrated SiC matrix having a metal impurity content of less than about 0.5 ppm.

DETAILED DESCRIPTION OF THE INVENTION

According to the present invention, semiconductor processing furniture is provided that comprises a high purity silicon melt infiltrated SiC matrix (Si/SiC) having a metal impurity content of less than about 0.5 ppm. The Si/SiC is produced by reacting a porous carbonaceous preform with liquid silicon. Liquid silicon reacts with carbon to form SiC and then fills the remaining porosity (Si/SiC). The carbonaceous preform generally consists of some form of carbon (powder or fiber) with the possible addition of other powders and a binder.

The preferred carbon source for Si/SiC is crushed carbon felt. However, other carbon sources can be used. Carbon felt is produced by companies such as Electrical Carbon Co. and is mainly used as furnace insulation. The carbon felt consists of carbon fibers with relatively low density, which is important for producing a preform with a desired porosity level. In accordance with the present invention, the silicon melt infiltrated SiC matrix purity is enhanced by the utilization of a high purity carbon matrix precursor. The carbon precursor is a carbon felt that has an impurity level of less than about 2 ppm of metal contaminant. The carbon precursor is produced by weaving a fibrous polymer into a felt. The felt is then heat treated in two steps. In a first step, it is heat treated in a neutral atmosphere at high temperature (from about 1500° C. to about 2900° C.) to convert the organic felt to carbon. The carbon is then purified in a halogen-containing gas such as chlorine at high temperatures, up to 2000° C. to produce a high purity carbon powder. Preferably the high temperature halogen treatment is between about 1500° C. to about 1900° C. and most preferably between about 1600° C. and 1800° C.

A porous carbon body called a preform is formed from the carbon precursor by a number of techniques. Most commonly, the high purity carbon powder is mixed with a binder and a solvent to form a slurry which can be cast or formed in a plastic state. The resulting body can be cured by heating to drive off solvent. Because of the presence of organic binder, any of the techniques commonly used for production of polymeric articles can be used for production of Si/SiC preforms as well. Dimensional change on infiltration is small, of the order of 0.5%, so the preform can be net shaped in a green state when it is easily machined.

Impurity levels (in ppm) of a typical Si/SiC composite are shown by analysis in TABLE 1. These impurity levels make structural Si/SiC unusable for semiconductor processing. The process of the invention produces a high purity structural Si/SiC suitable to comprise semiconductor processing furniture. In one aspect, the process comprises forming the porous carbon body from a carbon felt having a metal impurity content of less than about 0.5 ppm.

TABLE 1

| Element | Structural Si/SiC | Example 1 | Example 2 |
|---------|-------------------|-----------|-----------|
| Ni | 29.00 | 0.086 | 0.040 |
| Fe | 1100.00 | 0.460 | 0.250 |
| Mn | 28.00 | 0.028 | <.005 |
| Ti | 28.00 | 0.520 | 0.240 |
| Mg | 0.40 | 0.019 | <.050 |
| Cu | 15.00 | 0.030 | <.050 |
| Cr | 31.00 | <.170 | <.200 |
| Na | 0.03 | 0.170 | <.010 |
| K | 0.05 | 0.240 | <.050 |
| Ca | 60.00 | 0.490 | <.100 |
| Al | 180.00 | 0.075 | 0.010 |
| B | 300.00 | 0.210 | 0.500 |

Hayashi et al., U.S. Pat. No. 4,836,965 discloses a method of producing a high density and high strength silicon carbide member for a heat treatment furnace to be used in the manufacture of a semiconductor device. In the method, SiC powder, carbon powder, deflocculating agent and water are mixed to form a slip. Then the slip formed into a desired shape, cured under a nonoxidizing atmosphere, and removed of any impurity contained in the shaped body. Finally, the shaped body is immersed in a molten silicon to convert the carbon in the shaped body into silicon carbide.

The present invention relates to a silicon infiltrated carbon body (Si/SiC). A silicon infiltrated carbon body (Si/SiC) is different from a silicon infiltrated silicon carbide body. Solubility of SiC in molten silicon causes transport and recrystallization of the SiC thereby causing the SiC fibers to lose strength. Also, silicon carbide forms a strong bond with silicon, which results in brittle fracture of the composite. A silicon infiltrated carbon body (Si/SiC) has silicon carbide crystals substantially aligned in a pattern corresponding to the carbon fibers. The silicon carbide crystals are surrounded by domains of silicon metal to produce a silicon carbide-silicon matrix. The silicon infiltrated carbon bodies (Si/SiC) exhibit improved impact strength over the shaped product of a silicon infiltrated silicon carbide body.

The silicon infiltrated carbon body (Si/SiC) of the present invention is produced from a carbon felt by one of several processes. For example, suitable processes are disclosed in the following patents: Hillig et al., U.S. Pat. No. 4,120,731; Laskow et al., U.S. Pat. No. 4,141,948; Hillig et al., U.S. Pat. No. 4,148,894; Hillig et al., U.S. Pat. No. 4,238,433; Laskow et al., U.S. Pat. No. 4,240,835; Laskow et al., U.S. Pat. No. 4,294,788; Morelock, U.S. Pat. No. 4,385,020; Morelock, U.S. Pat. No. 4,737,328; Singh et al., U.S. Pat. No. 4,889,686; Singh et al., U.S. Pat. No. 4,931,311. The disclosures of these patents are incorporated herein by reference.

In a first exemplary infiltration process, an organic binder is used to shape a carbon fiber preform prior to molten silicon infiltration. In another aspect, a putty-like mixture of powdered silicon, particulate carbon, water and optionally silicon carbide powder is used to shape a preform. In yet another process, a carbon fiber structure such as a preform formed from the carbon felt can be machined or fashioned substantially to a desired shape.

In one embodiment of the invention, the infiltrating process environment is maintained under clean conditions to avoid the introduction of contaminants. The conditions of the clean process environment include the following:

All powder handling equipment is cleaned, including rinsing in acid to remove any metallic impurities.

Plaster-of-Paris molds commonly used to slipcast structural Si/SiC are not used in the clean process because of calcium impurity. During a conventional infiltration step, carbon furnace parts that come in contact with liquid silicon are liberally coated with boron nitride. Boron is an undesirable element in a wafer-forming environment. In the clean process, the use of boron nitride powder is completely eliminated because it imparts a high boron content to the Si/SiC.

Heating elements and furnace insulation are fabricated from graphite and contain different metal impurities. These impurities are eliminated by cleaning the furnace with a halogen-containing gas at elevated temperatures. This treatment converts undesirable contaminants into volatiles, which can be removed. Typical chlorine-containing compounds for the halogen-containing gas include $Cl_2$, $SiCl_4$, $SOCl_2$, $COCl_2$ and $CCl_4$. Cleaning is accomplished by injecting the gas directly into the furnace hot zone while the furnace is heated. Since different metals are more easily removed at different temperatures, the heating preferably consists of a plurality of temperatures ranging from about 800° C. to less than 1900° C. Higher temperatures can be used to accelerate the metal removal process. Preferably, the furnace is treated at three temperature levels—a first level at about 600° C. to about 1100° C., a second level at about 1100° C. to about 1500° C. and a third level at about 1400° C. to about 2000° C. Preferably, each temperature level is maintained for a period of at least about ½ hour to about 10 hours for a total halogen gas-containing treatment of from about 3 to about 20 hours. The preferred halogen-containing gas comprises chlorine gas. The halogen-containing gas can include a neutral carrier gas such as nitrogen or argon.

The furnace is held constantly under vacuum, being opened only to insert and remove samples. The entire furnace assembly is held in a semi-clean room enclosure to prevent contamination by dust when the furnace door is opened.

The following example is illustrative of the invention.

EXAMPLE 1

As-received felt was treated by a vendor, Bay Carbon Co, to remove the majority of metallic impurities. The only impurities detected by chemical analysis were 2.2 ppm Fe and 1.8 ppm of Ti. The cleaned carbon felt was crushed in a carbon die (thoroughly cleaned and acid-rinsed to remove potential metallic impurities). All handling of materials was done with gloves. Teflon containers were used which had been previously cleaned and washed in concentrated acid. Crushed carbon (21.7 grams) was mixed with electronic grade epoxy (36.8 g) dissolved in xylenes (1:1 ratio) and 4.1 g of epoxy hardener. The resulting slurry was vacuum cast into a silicone mold to form a rectangular bar approximately 2"×0.5"×0.4". The bar was heated to partially cure the binder. The bar was then removed from the mold and heated overnight at 100° C. to fully cure the epoxy.

A furnace for conducting an infiltrating step was cleaned by flooding the furnace with chlorine for about one hour at each of three different temperatures. The furnace was then cooled to room temperature.

The cured bar sample was placed on a carbon cloth (also cleaned by the vendor) with semiconductor grade silicon. The amount of silicon was 4 times the total weight of the sample and carbon cloth. The sample with cloth and silicon was placed on top of a layer of carbon felt in the clean carbon vacuum furnace. The temperature of the furnace was raised at the rate of 1 degree/minute up to 550° C. to decompose the binder. The temperature was then raised rapidly to 1450° C., held there for 1 hour and then reduced back to room temperature.

The sample was fully infiltrated with silicon. A portion of the sample was sent for chemical analysis, results of which are shown in TABLE 1. Impurity elements of greatest concern for semiconductor processing fall into three categories: transition metals, such as Fe, Ni, etc., alkalis and direct dopants, such as B, P, etc. TABLE 1 shows that all of these were present in concentrations lower than 0.5 ppm.

EXAMPLE 2

Crushed felt (25.5) grams was mixed with 3.75 g of electronic grade phenolic resin dissolved in butanol/xylenes solvent (1:1 ratio) and 7.5 g of electronic grade epoxy dissolved in xylenes (1:1 ratio). The slurry was vacuum cast into a silicone mold to form a bar. The bar was heated to partially cure the binder, removed from the mold and heated overnight at 100° C. to fully cure the binder. The bar was infiltrated by the same procedure in the same clean furnace as in Example 1. A portion of the resulting infiltrated bar was sent for chemical analysis. The results of the analysis are shown in TABLE 1. All of the elements that are detrimental to semiconductors were present in the bar in concentrations lower than 0.5 ppm.

EXAMPLE 3

Cleaned crushed carbon (42 gram) was mixed with 18.2 g of electronic grade epoxy dissolved in xylenes (1:1 ratio), 13.3 g butanol and 3.73 g hardener. Part of the slurry was vacuum cast into a silicone mold to form 6" long, ⅜" diameter rods. The remainder of the slurry was vacuum cast into a mold in the form of end-plates for a wafer carrier. All pieces were heated at 100° C. to cure the binder. A slurry was prepared using 5 grams of crushed clean carbon felt, 5 g of electronic grade epoxy, 5 grams of xylenes and 0.5 grams of epoxy hardener. Ends of the cast rods were coated with the slurry and inserted into appropriate holes in the end-plates to form a preform wafer carrier. The resulting preform was cured by heating at 100° C. for 2 hours. The wafer carrier was then infiltrated with silicon following procedure and in the clean furnace described in Example 1. The wafer carrier was completed by gluing together simple shapes. The carrier only required minor amount of machining (including machining of the slots, which support the wafers) after infiltration.

What is claimed is:

1. A process for producing a low impurity level ceramic composite, comprising:
   treating an annealing furnace with a halide-containing gas at elevated temperature to scavenge metal impurities; and
   infiltrating a porous carbon body with silicon within said annealing furnace.

2. The process of claim 1, comprising treating said annealing furnace with said halide-containing gas at a plurality of temperature levels ranging from about 80° C. to less than about 1900° C.

3. The process of claim 1, comprising treating said annealing furnace with said halide-containing gas at a plurality of temperature levels comprising a first level at about 600° C. to about 100° C., a second level at about 1100° C. to about 1500° C. and a third level at about 1400° C. to about 2000° C.

4. The process of claim 1, comprising treating said annealing furnace with said halide-containing gas at a plurality of temperature levels comprising a first level at about 600° C. to about 1100° C., a second level at about 1100° C. to about 1500° C. and a third level at about 1400° C. to about 2000° C., wherein each temperature level is maintained for a period of at least about ½ hour to about 10 hours.

5. The process of claim 1, comprising treating said annealing furnace with said halide-containing gas at elevated temperature for a period of from about 3 to about 20 hours.

6. The process of claim 1, wherein said halogen-containing gas is chlorine.

7. The process of claim 1, wherein said halogen-containing gas is produced from $Cl_2$, $SiCl_4$, $SOCl_2$, $COCl_2$ or $CCl_4$.

8. The process of claim 1, wherein said halogen-containing gas includes nitrogen or argon.

9. The process of claim 1, comprising infiltrating said porous carbon body with silicon in said furnace to produce a silicon melt infiltrated SiC matrix body.

10. The process of claim 1, comprising forming said porous carbon body from a carbon felt.

11. The process of claim 1, comprising forming said porous carbon body from a carbon felt having a metal impurity content of less than about 0.5 ppm.

12. The process of claim 1, comprising forming said porous carbon body by weaving a fibrous polymer into a felt, heating said felt in a halogen-containing gas at an elevated temperature up to about 2000° C. to produce a carbon powder, mixing said carbon powder with a binder or solvent to form a slurry; forming said slurry into a body and curing said body to form; said porous carbon body.

13. The process of claim 1, comprising forming said carbon body in the shape of semiconductor wafer processing furniture.

14. A process for producing a low impurity level ceramic composite, comprising:

forming a porous carbon body from a carbon felt having a metal impurity content of less than about 0.5 ppm; and infiltrating said porous carbon body with silicon.

15. A process for producing a low impurity level ceramic composite, comprising:

maintaining an annealing furnace under clean conditions to avoid the introduction of contaminants; and infiltrating a porous carbon body with silicon within said annealing furnace, where said porous carbon body is free of boron nitride and has a metal impurity content of less than about 2 ppm.

* * * * *